United States Patent
Tsuchiyama

Patent Number: 5,849,354
Date of Patent: Dec. 15, 1998

[54] METHOD FOR FORMING A PHOSPHOR SCREEN OF A MONOCHROME CATHODE RAY TUBE

[75] Inventor: Tadayuki Tsuchiyama, Osaka, Japan

[73] Assignee: Matsushita Electronics Corporation, Osaka, Japan

[21] Appl. No.: 866,641

[22] Filed: May 30, 1997

[30] Foreign Application Priority Data

Jun. 3, 1996 [JP] Japan .................................. 8-140518

[51] Int. Cl.⁶ ...................................................... B05D 5/06
[52] U.S. Cl. ............................................. 427/73; 427/240
[58] Field of Search ...................................... 427/73, 240

[56] References Cited

U.S. PATENT DOCUMENTS

| | | | |
|---|---|---|---|
| 4,455,323 | 6/1984 | Ishizuka et al. ........................... | 427/73 |
| 4,758,449 | 7/1988 | Kimura et al. .............................. | 427/73 |
| 4,806,389 | 2/1989 | Peters et al. ............................... | 427/73 |
| 5,130,190 | 7/1992 | Woochan .................................... | 427/73 |

FOREIGN PATENT DOCUMENTS 61-10827  1/1986  Japan .

*Primary Examiner*—Janyce Bell
*Attorney, Agent, or Firm*—Merchant, Gould, Smith, Edell, Welter & Schmidt, P.A.

[57] ABSTRACT

A method for forming a very fine phosphor screen of a monochrome cathode ray tube whose roughness is inconspicuous even if the picture is enlarged. White phosphors (P45) whose average particle diameter D by a dry method is 1.5 $\mu$m, ethanol, and ammonia water are stirred and maintained at 50° to 55° C. A mixed solution of ethyl silicate and ethanol as well as ammonia water are separately dropped into the mixed solution containing the phosphor particles (P45). After standing still, the supernatant liquid is removed by decantation, and the precipitates are dehydrated, and dried by heating, and sieved to obtain white phosphors (P45) whose surfaces are coated with silicon dioxide. Such phosphors satisfy $1D \leq d \leq 1.3D$, in which "D" represents an average particle diameter measured by a dry method, and "d" represents an average particle diameter measured by a wet method. Therefore, the phosphors have excellent dispersion property in a suspension.

9 Claims, 8 Drawing Sheets

METHOD FOR FORMING A PHOSPHOR SCREEN OF A MONOCHROME CATHODE RAY TUBE

BACKGROUND OF THE INVENTION

1. Field of the Invention

The present invention relates to a method for forming a phosphor screen of a monochrome cathode ray tube used for a view finder tube for a video camera, a projection tube for a projection TV, and the like, and more particularly to a method for forming a phosphor screen of a monochrome cathode ray tube in which a fine and smooth phosphor screen can be formed.

2. Description of the Prior Art

In a monochrome cathode ray tube such as a view finder tube used for a video camera or a projection tube for a projection TV, the picture displayed on the surface of its phosphor layer, a phosphor screen, is enlarged by a lens. Therefore, it is important to make the size of a luminescent pixel for an electron beam fine as much as possible. In order to prevent the light from a portion of the phosphor layer near the electron gun from being scattered with the result that the luminescent pixels are enlarged in the user's sight, the phosphor particles in the layer are required to be closer.

Laid-open Japanese Patent Application No. (Tokkai sho) 61-10827 proposes a method for improving the phosphor screen fineness. In this method, a suspension in which phosphor particles are dispersed is injected into a glass bulb (the main body of a cathode ray tube), and the phosphor particles in the suspension are forced to be settled on the face of the glass bulb by centrifugal force to form a phosphor layer. As a result, the space between the phosphor particles in the phosphor layer is made smaller to improve the phosphor screen fineness.

In a view finder tube or a projection tube, the picture displayed on the phosphor screen is enlarged by 5 to 30 times with a lens to be perceived. However, recently, further miniaturization of a view finder tube has been demanded with the miniaturization of video cameras, and the magnification of a lens for the picture displayed on the phosphor screen tends to be greater. Thus, in order to prevent the degradation of the display quality for such an enlarged picture, the fineness of the phosphor screen needs to be further improved to make even the slighter roughness of the surface of the phosphor screen inconspicuous. Also, the quality level of the enlarged picture of a projection TV is lower than that of a direct-view TV. Thus, in order to further improve the display quality level, the fineness of the phosphor screen of a projection tube needs to be further improved. However, by simply using a method for forcing phosphor particles in a suspension to be settled on the inner surface of a glass bulb (the main body of a cathode ray tube) by centrifugal force as proposed above, the fineness of the phosphor screen cannot be improved to the level required for the phosphor screen of a view finder tube or a projection tube for a projection TV manufactured recently.

SUMMARY OF THE INVENTION

In view of the above-mentioned problems, the present invention seeks to provide a method for forming a phosphor screen of a monochrome cathode ray tube in which a very fine phosphor screen can form a good screen whose roughness is inconspicuous even if the picture is enlarged.

The inventor found that, in a sedimentation method in which phosphor particles in a suspension are settled on the inner surface of a glass bulb to form a phosphor layer whose surface serves as a phosphor screen, an improvement in the dispersion property of phosphor particles in a suspension can make the phosphor layer remarkably finer. As a result, a method for forming a phosphor screen of a monochrome cathode ray tube according to the present invention comprising the following structure was obtained.

In order to achieve the above object, the method for forming a phosphor screen of a monochrome cathode ray tube comprising settling phosphor particles from a suspension on an inner surface of a main body of a monochrome cathode ray tube to form a phosphor layer on the surface, wherein the phosphor particles satisfy $1D \leq d \leq 1.3D$, in which D represents an average particle diameter measured by a dry method, and d represents an average particle diameter measured by a wet method. Thus, the phosphor particles satisfying the above relational expression (that is, phosphor particles whose average particle diameter "d" measured by a wet method is in the range of 1 to 1.3 times the average particle diameter "D" measured by a dry method) have very low aggregation property in water and are finely dispersed in water. Therefore, when a suspension of such phosphor particles is used, phosphor particles having a very small particle diameter are accumulated uniformly on the inner surface of the main body of a monochrome cathode ray tube to form a phosphor layer. Thus, a flatter phosphor layer can be formed in which the fineness is improved to such a degree that the roughness is inconspicuous even if the picture is enlarged.

On the other hand, the phosphor particles that do not satisfy the above relational expression (that is, phosphor particles whose average particle diameter "d" measured by a wet method is larger than 1.3 times the average particle diameter "D" measured by a dry method) do not have low aggregation property in water. Therefore, when a suspension of such phosphor particles is used, the aggregates of phosphor particles having a large particle diameter are deposited. Therefore, the fineness of the phosphor screen cannot be fully improved.

In the above, the dry method means the so-called air permeation method in which a particle diameter is calculated from the permeability of air at the time that the dry air permeates the aggregates of particles. The wet method means a method for measuring the particle diameter with particles existing in water, such as a Coulter counter method generally used in measuring the particle diameter of each type of fine particle.

DETAILED DESCRIPTION OF THE INVENTION

In the present invention, phosphor particles whose average particle diameter "D" measured by a dry method is preferably 1.0 to 13 μm, more preferably 1.0 to 7 μm, are used. This is because, if the average particle diameter "D" is within this range, the fineness of the phosphor layer formed by sedimentation and deposition of the phosphor particles can be further improved, and therefore the phosphor screen surface can be made flatter.

Figure 1:
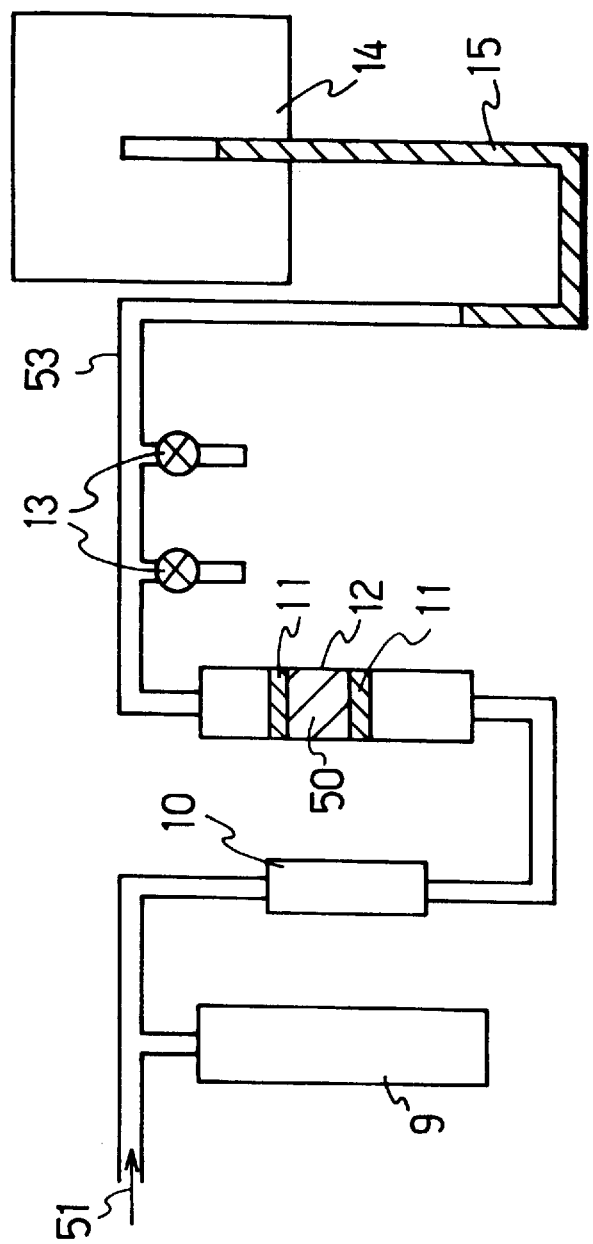
FIG. 1 shows a schematic structure of "Fisher Sub-Sieve Sizer" made by FISHER Scientic Co., Ltd., an example of an apparatus for measuring a particle diameter by a dry method.
Figure 8:
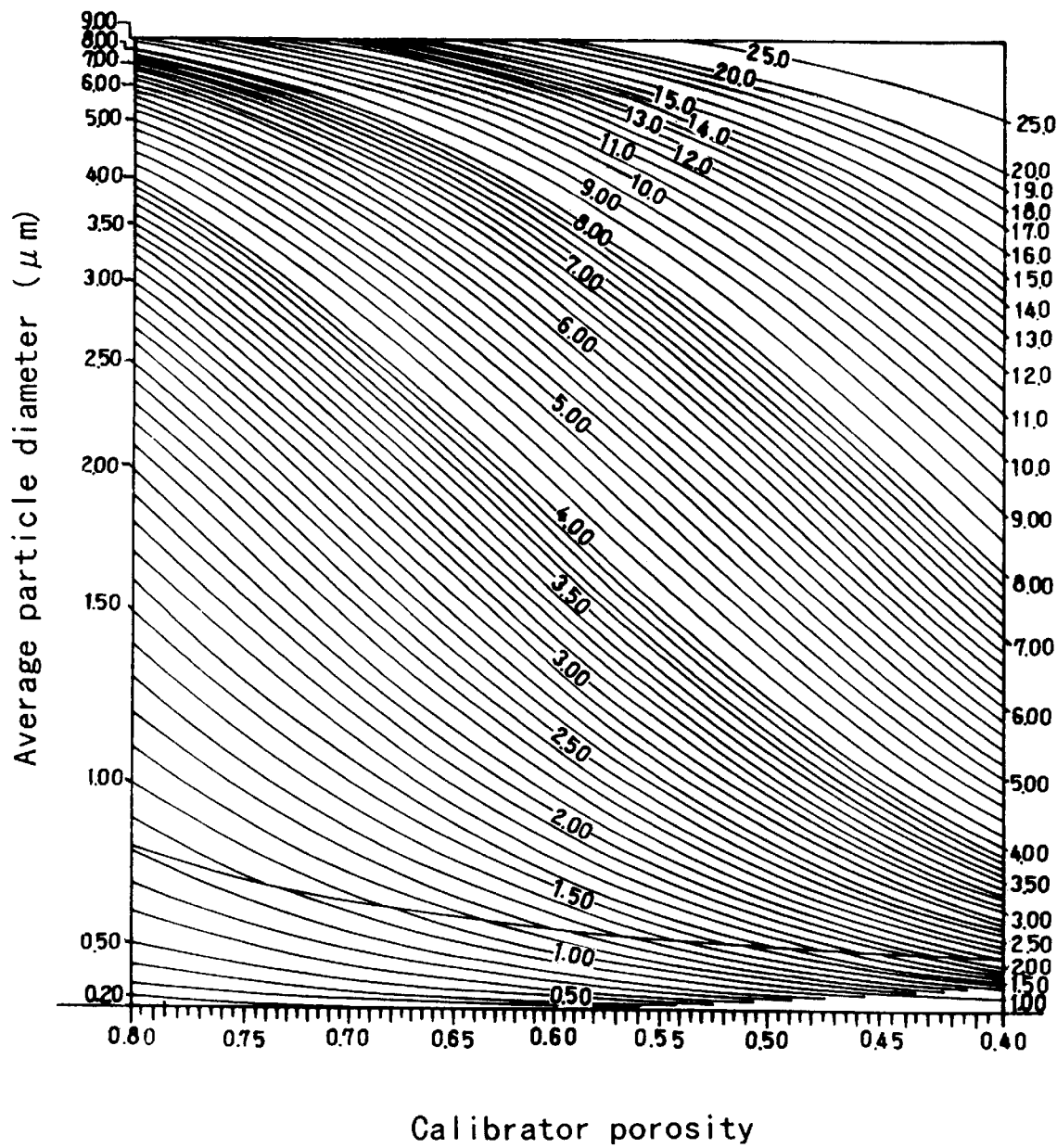
FIG. 8 show a calculator chart used for the apparatus for measuring a particle diameter in FIG. 1.

An example of a measurement apparatus for measuring a particle diameter by a dry method (an air permeation method) used in the present invention is "Fisher Sub-Sieve Sizer" (trade name) made by FISHER Scientic Co., Ltd. FIG. 1 shows a schematic structure of the apparatus. The procedure for measuring a particle diameter using this apparatus will be described below. First, 0.01 g of dry phosphor particles (a sample) 50 are weighed out, filled in a sample tube made of brass 12 under a fixed pressure, and put between plugs 11. The plug 11 is a laminate in which four or five disk-shaped filter papers are laminated. The pressure of air 51 generated by an air pump not shown, about 2 kgf/cm$^2$, is adjusted to 50 cm H$_2$O by a regulator 9. The air 51 flows into the sample tube 12 through a drier 10 filled with magnesium sulfate powder. When the dry air having a pressure of 50 cm H$_2$O flows in such a sample tube 12, the dry air passed through the phosphor particles (the sample) 50 in the sample tube 12 pushes up the water level of an outside manometer 15 located in the outlet of a piping 53. Reading this water level with a calculator chart 14 attached behind the outside manometer 15, the value of the particle diameter can be calculated from the water level. Usually, before the measurement, the calculator chart 14 is fixed to the porosity specified by, the calibrator by using an attached calibrator of porous material not shown, and the water level of the outside manometer 15 is corrected to the average particle diameter specified by the calibrator with a needle valve 13. FIG. 8 shows the calculator chart 14, in which the horizontal axis indicates the porosity of the calibrator, and the vertical axis indicates the average particle diameters.

In the present invention, an electric resistance method in which a change in electric resistance value, occurring when fine particles in an electrolysis solution pass through an orifice, is amplified to measure the number, the volume, and the diameter of fine particles can be used as a wet measurement method. An example of a specific measurement apparatus using such an electric resistance method is "ELZONE80XY-2" (trade name) made by Particle Data Co., Ltd. In this apparatus, an orifice (pore) having an aperture diameter in the range of 0.3 to 1200 μm is generally used. Also, an aqueous solution in which an electrolyte such as sodium chloride or sodium phosphate is dissolved is used as the electrolysis solution. The electric resistance R in the orifice portion without fine particles passing through the orifice and the electric resistance R' in the orifice portion with fine particles passing through the orifice are measured to find a resistance change amount ΔR=R'−R. By applying this amount to the following equation, the particle volume is calculated, and the number and diameter of the particles are derived.

$$\text{Particle volume} = \frac{\Delta R \times (\text{orifice cross-sectional area})^2}{\text{Electrolysis solution specific resistance}}$$

In the present invention, a suspension, in which phosphor particles whose average particle diameter "d" measured by the wet method is in the range of 1 to 1.3 times the average particle diameter "D" measured by the dry method are dispersed, is used as mentioned above. An example of a method for obtaining phosphor particles having low aggregation property in a liquid in which the average particle diameter "d" obtained by the wet method and the average particle diameter "D" obtained by the dry method do not change much is a method for improving the hydrophobicity of individual particles by coating the surface of each phosphor particle with silicon dioxide or phosphate such as magnesium pyrophosphate or zinc pyrophosphate. Such surface coating with silicon dioxide will be specifically described below. 4.8 kg of ethanol, 200 g of ammonia water (18 wt. %), and 2 kg of white phosphors are put in a container, stirred, and maintained at 50° to 55° C. Then, a mixed solution of 11 g of ethyl silicate and 90 g of ethanol as well as 250 g of ammonia water (18 wt. %) are prepared and separately dropped into the mixed solution containing the white phosphors. After standing still, the supernatant liquid is removed by decantation, and the precipitates (the white phosphors) are dehydrated, dried at a temperature of 110° to 120° C. for 8 to 12 hours, and sieved. The thus obtained white phosphors are coated with 0.2 wt. % of silicon dioxide based on the weight of the whole phosphors (phosphor particles and silicon dioxide). Similarly, when obtaining the coating of 0.1 wt. % of silicon dioxide per the whole phosphors (phosphor particles and silicon dioxide), a mixed solution of 5.5 g of ethyl silicate and 45 g of ethanol is used. When obtaining the coating of 0.3 wt. % of silicon dioxide per the whole phosphors (phosphor particles and silicon dioxide), a mixed solution of 16.5 g of ethyl silicate and 135 g of ethanol is used. When obtaining the coating of 0.05 wt. % of silicon dioxide per the whole phosphors (phosphor particles and silicon dioxide), a mixed solution of 2.75 g of ethyl silicate and 22.5 g of ethanol is used. In the above, ethanol is used as a solvent for ethyl silicate. However, alcohols having 1 to 3 carbon atoms such as methanol, ethanol, and propanol can be generally used as the solvent for ethyl silicate. Also, in the above, ethyl silicate is used. However, methyl silicate, potassium water glass, or the like can be alternatively used. In this case, a typical solvent for methyl silicate is methanol, and a typical solvent for potassium water glass is water. Also, the above ammonia water is a pH regulator for maintaining the mixed solution at 8 pH or more. However, sodium hydroxide, potassium hydroxide, or the like, other than ammonia water, can be used as such a pH regulator. When performing such surface coating for phosphor particles with silicon dioxide, the amount of silicon dioxide coating is generally 0.02 to 5 wt. % based on the weight of the whole phosphors (phosphor particles and silicon dioxide), preferably 0.1 to 0.6 wt. %.

A method for surface coating with phosphate will be briefly described below. For example, when producing phosphors in which only magnesium pyrophosphate is adhered to the surfaces of the particles, first, the phosphors are appropriately burned and washed to remove the flux, etc. Then, a required amount of an aqueous solution of pyrophosphate is added to these phosphors according to a predetermined amount for surface treatment, and the whole suspension is heated to a temperature around 30° to 60° C. while being stirred for 10 minutes. Then, an aqueous solution of magnesium salt containing magnesium ions stoichiometrically equivalent to or in a 2- or 3-fold of the amount of the previously added pyrophosphate is added, and the suspension is stirred for several minutes and is left for about an hour. Thus, if the pH of the suspension after the aqueous solution of magnesium salt is added is about 6.5 or more, only the calculated amount of magnesium pyrophosphate substantially corresponding to the total amount of the added phosphate is deposited on the surfaces of the phosphor particles, and is substantially adhered to the phosphor particles. If the pH is 6.5 or less, the amount of magnesium pyrophosphate deposited is remarkably reduced or magnesium pyrophosphate is not produced at all. Therefore, by some way, such as by appropriately selecting the types and amounts of the aqueous solution of phosphate and the aqueous solution of magnesium salt as mentioned above, or by further adding an aqueous solution of NaOH or the like after adding these aqueous solutions, the pH of the suspension is maintained at 6.5 or more so as to deposit magnesium pyrophosphate on the surfaces of the phosphor particles. Then, the excess electrolyte is removed by washing, and drying is performed at about 150° to 300° C. As a result, phosphors with magnesium pyrophosphate and, in some case, a small amount of magnesium orthophosphate adhered to their surfaces are obtained. In the case of such surface coating with phosphate, the amount of phosphate coating is generally 0.02 to 5 wt. % per the whole phosphors (phosphor particles and phosphate), preferably 0.1 to 0.6 wt. %.

The preparation of a suspension is performed as will be described below.

Figure 2:
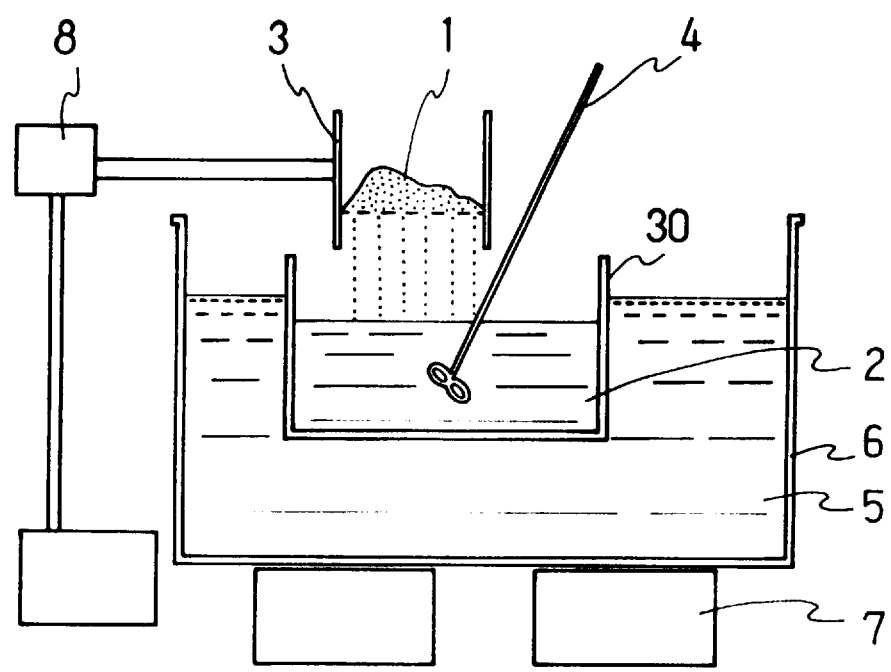
FIG. 2 shows a system for preparing a suspension FIGS. 3(a) and (b) show systems for preparing a suspension and injecting it into a glass bulb.

FIG. 2 shows the operation of preparing a suspension. As shown in FIG. 2, a vibrator 8 is connected to a sieve 3. A required amount of the above phosphors 1 whose surfaces are coated with silicon dioxide is weighed out and put in the sieve 3. The phosphors 1 are put in an aqueous solution of potassium water glass 2 having a required concentration with the sieve 3. Then, the solution is stirred with a stirring rod 4. The mesh size of the sieve 3 is 1.0 to 1.8 mm. A vessel 30 for containing the aqueous solution of potassium water glass 2 is dipped in water 5 in an ultrasonic cleaner 6 connected to an ultrasonic vibrator 7. The ultrasonic vibrator 7 is operated as soon as the phosphors 1 are put. In this embodiment, the ultrasonic vibrator 7 has the capability of generating an ultrasonic wave at 400 W and 12 kHz, for example, and the stirring blades at the tip of the stirring rod 4 are rotated at about 600 rpm. After the solution is maintained under this condition for about 30 minutes, a primary suspension is obtained. Then, the primary suspension is mixed with an aqueous solution of potassium water glass having a required concentration, an aqueous solution in which a dispersion stabilizing agent other than potassium water glass is dissolved, or the like, and is stirred. As a result, a final suspension is obtained. The concentration of potassium water glass in the final suspension is generally 0.02 to 0.1 wt. %. A concrete example of the potassium water glass is "C type" (trade name) in "Ohkaseal" (trade name) series by Tokyo Ohka Kogyo Co., Ltd.

Figure 3A:
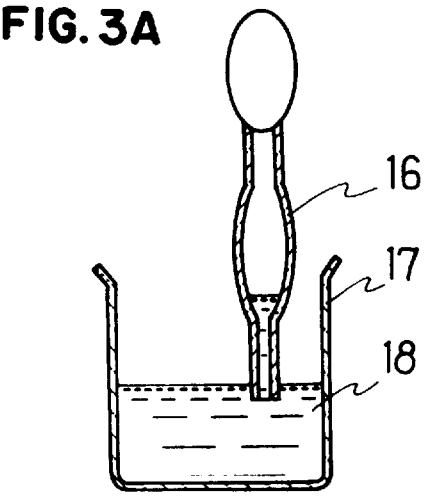
Figure 3B:
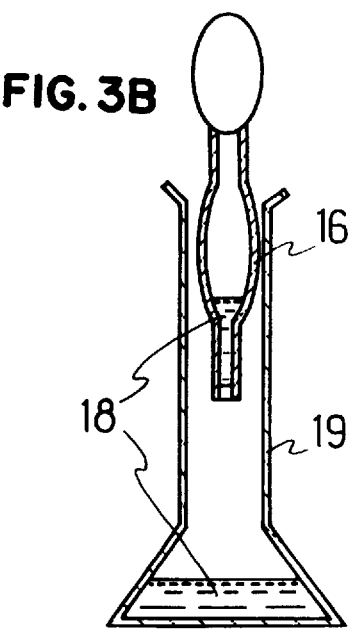
Figure 4A:
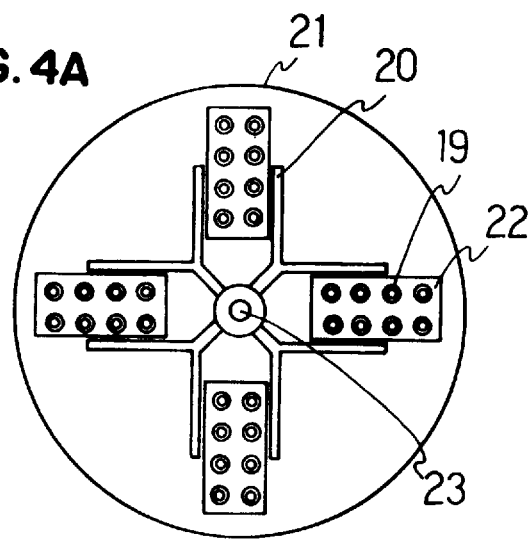
FIGS. 4(a) and (b) show a top view and a side view of a centrifuge machine in which the buckets hold glass bulbs into which a suspension is injected.
Figure 5A:
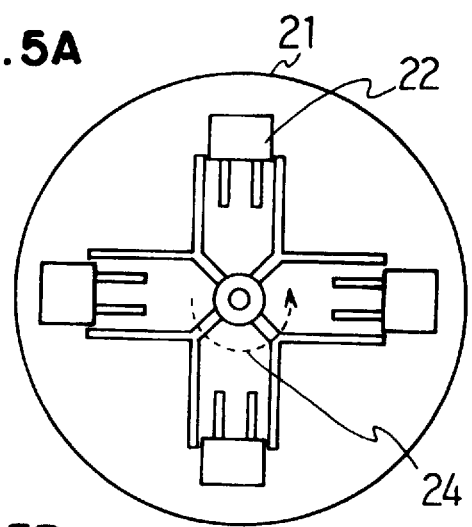
FIGS. 5(a) and (b) show a top view and side view of the centrifuge machine in which the rotation axis is rotated so that a centrifugal force acts on the glass bulbs.
Figure 5B:
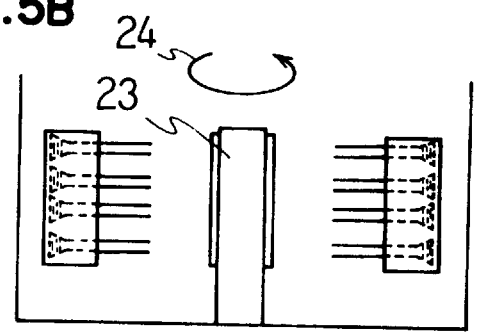

A natural settling method in which only gravity acts on phosphor particles, or a forced settling method in which centrifugal force acts on phosphor particles so as to be settled as mentioned above in the prior art is used for the settling of phosphor particles on the inner surface of a glass bulb (the main body of a cathode ray tube). However, it is preferred to use the forced settling method to obtain a finer and flat phosphor screen. A concrete example of a phosphor screen forming process using the forced settling method will be described below. First, as shown in FIG. 3(a), 5 ml of a 0.04 wt. % aqueous solution of barium acetate, 2 ml of a 3.5 wt. % aqueous solution of potassium water glass, and 1 ml of a suspension in which the mixing ratio of an aqueous solution of potassium water glass to phosphors is 20:1 by weight are mixed in a beaker 17 for 10 seconds. Then, 0.8 ml of the mixed solution 18 is taken by a micropipet 16 and is injected into a glass bulb 19 as shown in FIG. 3 (b). Immediately after this, the glass bulb 19 is held in a hole of a bucket 22 of a centrifugal separator 21 in which the bucket 22 is attached to a tip portion of a plurality of arms 20 connected to and extending radially from a rotation axis 23 so as to be freely rotated, as shown in FIGS. 4(a) and (b). Under this condition, the rotation axis 23 is rotated in the direction of arrow 24 with an acceleration of 5000 m/sec$^2$ for 3 to 4 minutes, so that a centrifugal force acts on the glass bulb 19. See FIGS. 5(a) and (b). As a result, the phosphors in the mixed solution are forced to be settled. Then, after a transparent supernatant liquid is discharged with the glass bulb 19 being tilted, water is removed from the phosphor layer formed on the base surface of the glass bulb 19 in an atmosphere of 120° C. under a reduced pressure of about 1 mmHg, and the phosphor layer is dried.

After obtaining the phosphor layer in the above manner, the bulb is subjected to the general processes of manufacturing a cathode ray tube, such as a baking process in which an acetic acid component in a phosphor layer is burned, a process in which an electron gun is enclosed in a glass bulb, an pumping process in which the glass bulb is evacuated, and a cathode activation process, and the cathode ray tube is completed.

EXAMPLE 1

In white phosphors (P45) conventionally used as phosphors for forming the phosphor layer (phosphor screen) of a view finder tube, the average particle diameter "D" measured by a dry method was 1.5 $\mu$m, and the average particle diameter "d" measured by a wet method was 2.0 $\mu$m, in which d/D=1.33. Phosphors were prepared in which the surfaces of such white phosphors were coated with 0.05 wt. %, 0.1 wt. %, 0.2 wt. %, and 0.3 wt. % of silicon dioxide based on the weight of the whole phosphors (phosphor particles and silicon dioxide) by the abovementioned method. Then, the average particle diameters "D" and "d" of the respective phosphors were measured by the dry method and the wet method respectively to calculate d/D. The results are shown in Table I.

TABLE I

|  | Average particle diameter "d" by wet method ($\mu$m) | Average particle diameter "D" by dry method ($\mu$m) | d/D |
| --- | --- | --- | --- |
| Without surface coating with silicon dioxide (conventional product) | 2.0 | 1.5 | 1.33 |
| 0.05 wt. % silicon dioxide surface coating product | 1.7 | 1.5 | 1.13 |
| 0.1 wt. % silicon dioxide surface coating product | 1.6 | 1.5 | 1.06 |
| 0.2 wt. % silicon dioxide surface coating product | 1.75 | 1.5 | 1.17 |
| 0.3 wt. % silicon dioxide surface coating product | 1.9 | 1.5 | 1.26 |

In Table I, the average particle diameter "D" by the dry method was measured by using the above-mentioned "Fisher Sub-Sieve Sizer" (trade name) made by FISHER Scientic Co., Ltd (the measurement precision is up to one decimal place). The average particle diameter "d" by the wet method was measured by using the orifice having an aperture diameter of 20 μm in the above-mentioned "ELZONE80XY-2" (trade name) made by Particle Data Co., Ltd. and by using an aqueous solution in which NaCl (0.9 wt. %) and $Na_3PO_4 \cdot 12H_2O$ (0.2 wt. %) were dissolved as an electrolysis solution. As shown in Table I, by coating the surfaces of the white phosphors (P45) with silicon dioxide, the d/D of the white phosphors (P45) was 1.3 or less, so that the average particle diameter "d" measured by the wet method could be closer to the average particle diameter "D" measured by the dry method.

Figure 6:
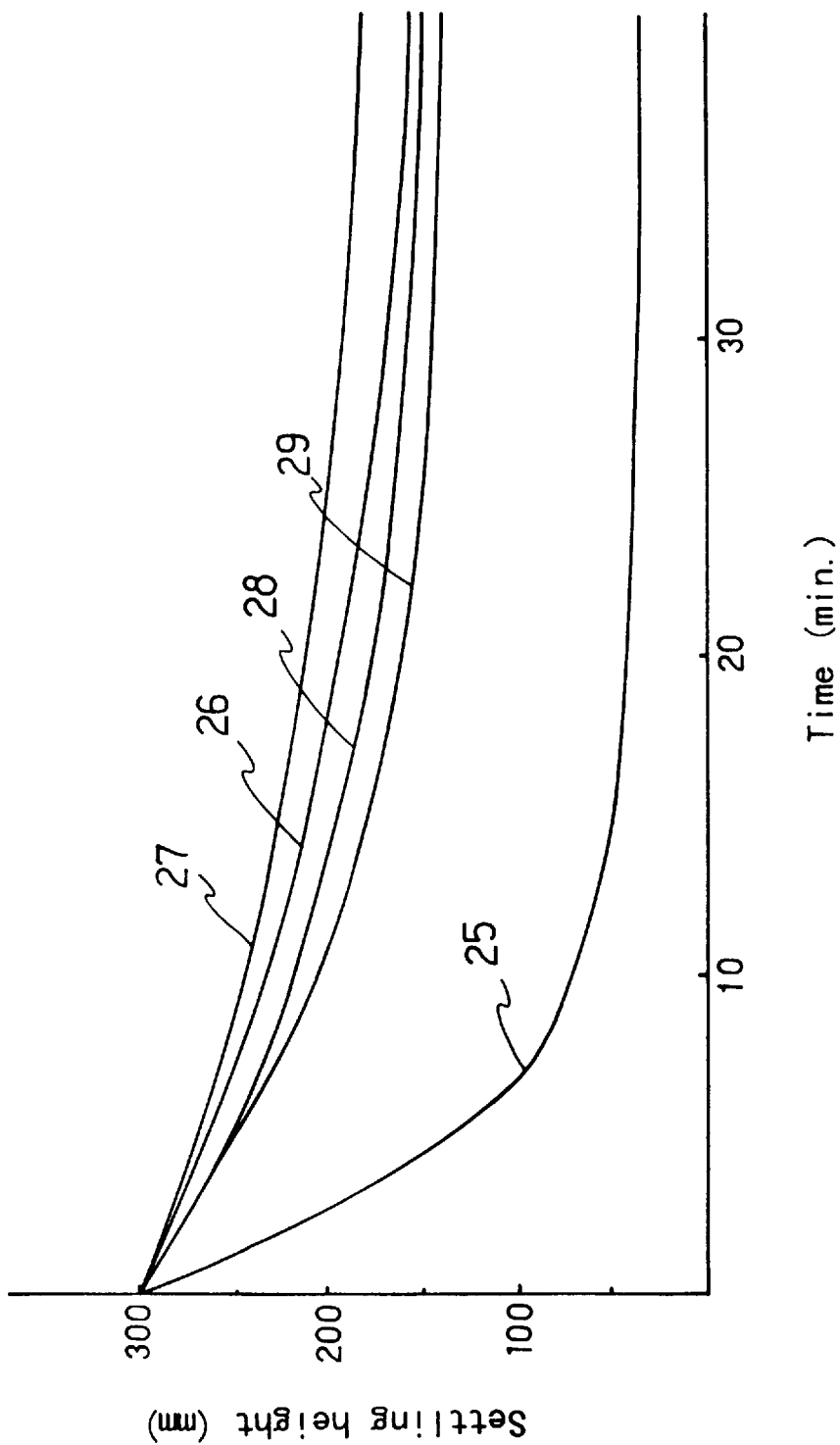
FIG. 6 shows a settling height graph for a settling test on phosphors in a suspension, FIGS. 7(a) and (b) show the evaluated results of the display qualities and the horizontal resolutions of phosphor screens.

Next, in order to confirm the dispersion properties of the phosphors whose surfaces are not coated with silicon dioxide and the phosphors whose surfaces are coated with silicon dioxide in a suspension, the settling properties of the phosphors in a suspension were examined. First, 5 g of phosphors were put in 30 ml of a 0.04 wt. % aqueous solution of barium acetate. Then an ultrasonic vibration of 800 W and 32 kHz was applied to this solution for 3 minutes. The solution was put in a settling tube having a cross-sectional area of 1 square centimeter to a height of 300 mm. The interface of a phosphor dispersed layer and a transparent supernatant liquid layer is called a sedimentation height, and the change characteristics of the settling height with respect to time were measured. The results are shown in FIG. 6. In FIG. 6, 25 indicates the characteristic line of white phosphors (P45) whose surfaces are not coated with silicon dioxide, and 26, 27, 28, and 29 indicate the characteristic lines of white phosphors (P45) whose surfaces are coated with 0.05 wt. % silicon dioxide, 0.1 wt. % silicon dioxide, 0.2 wt. % silicon dioxide, and 0.3 wt. % silicon dioxide, respectively. As seen from FIG. 6, the settling heights of the phosphors whose surfaces are coated with silicon dioxide apparently dropped later than the settling height of the phosphors whose surfaces are not coated with silicon dioxide, indicating that the dispersion properties of the phosphors whose surfaces are coated with silicon dioxide in the suspension were far more improved than those of the phosphors whose surfaces are not coated with silicon dioxide. Also, the settling height of the phosphors whose surfaces are coated with 0.1 wt. % silicon dioxide dropped latest, indicating that, in the case of white phosphors (P45), the surface coating with about 0.1 wt. % of silicon dioxide improved the dispersion property in the suspension the most.

Figure 4B:
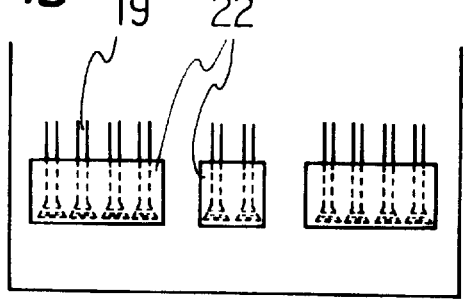

With respect to the white phosphors (P45) whose surfaces are not coated with silicon dioxide and the white phosphors (P45) whose surfaces are coated with silicon dioxide as mentioned above, a suspension was prepared. Then, the phosphors were settled on the base surface of a glass bulb by the forced settling method shown in FIGS. 3–5 to form a phosphor layer (a phosphor screen). After this, a view finder tube was completed according to the above-mentioned common method.

Figure 7A:
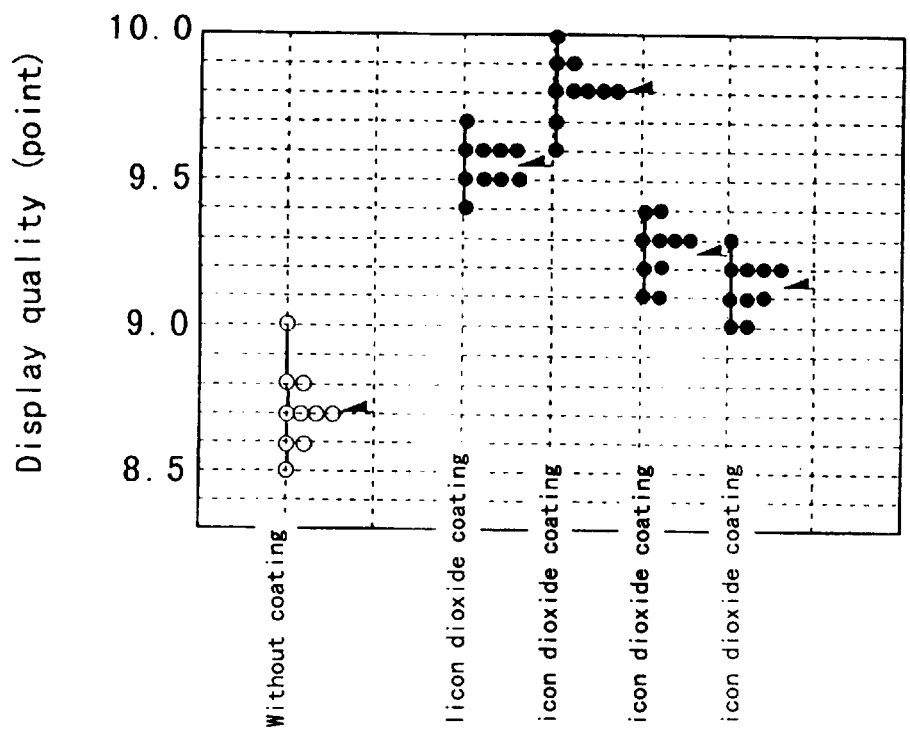
Figure 7B:
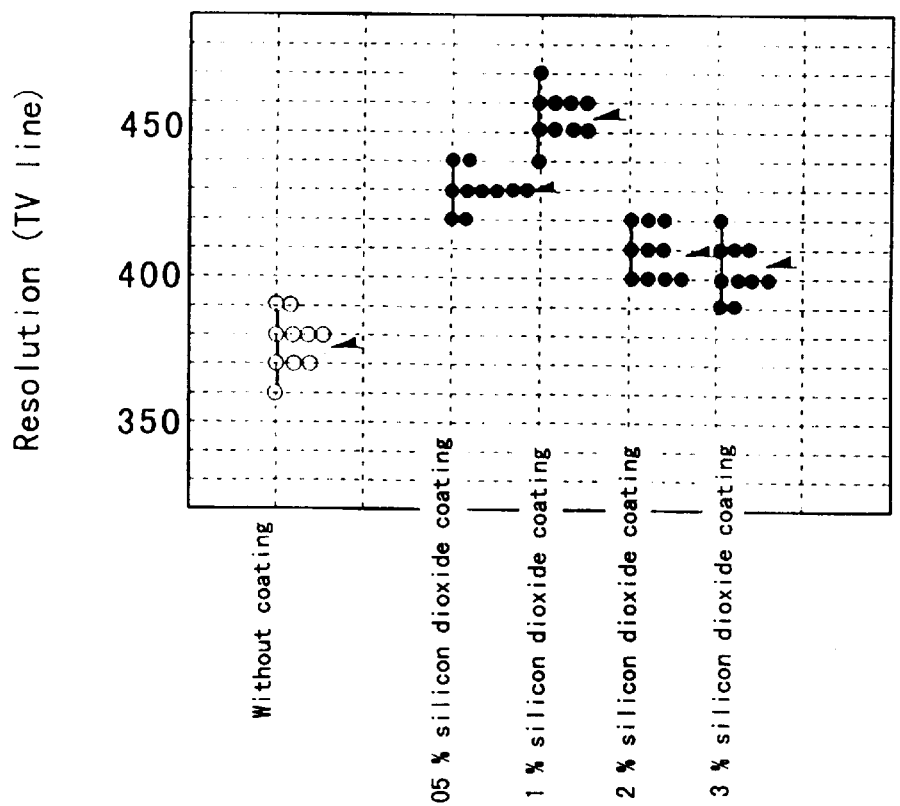

FIGS. 7(a) and (b) show the results of evaluating the display qualities and the horizontal resolutions of the phosphor screens. In FIG. 7, open and black circles indicate test samples, and 10 samples were used for each of the phosphor screens formed by using conventional white phosphors whose surfaces are not coated with silicon dioxide and the phosphor layers whose surfaces are coated with silicon dioxide (0.05 wt. %, 0.1 wt. %, 0.2 wt. %, and 0.3 wt. %). An arrow in FIG. 7 indicates the average value of the evaluated values obtained from the ten test samples. The display qualities in FIG. 7(a) were decided by observing the phosphor screens visually. Higher points indicate that the phosphor screens are finer and clearer. The horizontal resolutions in FIG. 7(b) were decided by actually projecting a TV picture. In the phosphor screens using phosphors of d/D=1.13 (coated with 0.05 wt. % of silicon dioxide), the display quality was 9.55 points, and the horizontal resolution was 430 lines. In the phosphor screens using phosphors of d/D=1.06 (coated with 0.1 wt. % of silicon dioxide), the display quality was 9.81 points, and the horizontal resolution was 445 lines. In the phosphor screens using phosphors of d/D=1.17 (coated with 0.2 wt. % of silicon dioxide), the display quality was 9.25 points, and the horizontal resolution was 408 lines. In the phosphor screens using phosphors of d/D=1.26 (coated with 0.3 wt. % of silicon dioxide), the display quality was 9.15 points, and the horizontal resolution was 405 lines. In the phosphor screens without surface coating of silicon dioxide (d/D=1.33), the display quality was 8.7 points, and the horizontal resolution was 380 lines.

From the evaluated results as mentioned above, it could be confirmed that the phosphor screens formed of phosphors having a d/D of 1.3 or less whose surfaces are coated with silicon dioxide were far improved in fineness versus the phosphor screens formed of phosphors having a d/D more than 1.3 whose surfaces are not coated with silicon dioxide. In general, view finder tubes are not commercially acceptable unless they have a horizontal resolution of 400 lines or more. However, it could be confirmed that, in a cathode ray tube having a phosphor screen formed by using phosphors having a d/D of 1.3 or less, the horizontal resolution was 400 lines or more, therefore the cathode ray tube was adequately usable as a view finder tube. In the phosphor screens formed by using phosphors having a d/D of 1.3 or less, the pinholes caused by dropping of aggregated phosphors occurring in the waste water treatment process were remarkably reduced. In other words, in the phosphor screens obtained by drying after the waste water treatment, the rate of the occurrence of pinholes was 9 to 13% in the phosphor screens formed by using conventional phosphors having a d/D more than 1.3, and the rate of the occurrence of pinholes was 2 to 3% in the phosphor screens formed by using phosphors having a d/D of 1.3 or less. Here, the pinhole refers to the one caused by dropping of phosphors in a lump of $\phi 35$ μm or more.

As mentioned above, according to the method for forming a phosphor screen of a monochrome cathode ray tube according to the present invention in which phosphor particles in a suspension are settled on the inner surface of the main body of a monochrome cathode ray tube to form a phosphor layer whose surface serves as a phosphor screen, phosphor particles satisfying $1D \leq d \leq 1.3D$ are used, where "D" represents an average particle diameter measured by a dry method and "d" represents an average particle diameter measured by a wet method. Thus, a flat phosphor screen can be formed in which the fineness is improved to such a degree that its roughness is inconspicuous even if the picture is enlarged. Therefore, a monochrome cathode ray tube can be obtained which can form a good screen whose roughness is inconspicuous even if the picture is enlarged.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for forming a phosphor screen of a monochrome cathode ray tube comprising settling phosphor particles in a suspension on an inner surface of a main body of a monochrome cathode ray tube to form a phosphor layer on the surface, wherein the phosphor particles satisfy $1D \leq d \leq 1.3D$, in which "D" represents an average particle diameter measured by a dry method, in which the particle diameter of the phosphor particles is measured in a dry state, and "d" represents an average diameter measured by a wet method, in which the particle diameter of the phosphor particles is measured in a suspension.

2. The method according to claim 1, wherein the phosphor particles in the suspension are settled by centrifugal force.

3. The method according to claim 1, wherein the surfaces of the phosphor particles are coated with a material selected from the group consisting of silicon dioxide and a phosphate.

4. The method according to claim 3, wherein the material is silicon dioxide.

5. The method according to claim 4, wherein the silicon dioxide is introduced to the surfaces of the phosphor particles as a silicate compound.

6. The method according to claim 1, wherein the average particle diameter "D" is 1.0 to 13 $\mu$m.

7. The method according to claim 1, wherein the dry method is an air permeability method.

8. The method according to claim 1, wherein the wet method is a Coulter counter method.

9. The method according to claim 1, wherein the phosphor particles are white phosphor particles.

* * * * *